(12) United States Patent
Aare

(10) Patent No.: US 8,678,722 B2
(45) Date of Patent: Mar. 25, 2014

(54) ROTATABLE TOOL FOR CHIP REMOVING MACHINING AS WELL AS A LOOSE TOP THEREFOR

(75) Inventor: Magnus Aare, Sandviken (SE)

(73) Assignee: Sandvik Intellectual Property AB, Sandviken ( * ) Notice: Subject to any disclaimer, the term of this patent is extended or adjusted under 35 U.S.C. 154(b) by 950 days.

(21) Appl. No.: 12/818,637

(22) Filed: Jun. 18, 2010

(65) Prior Publication Data

US 2010/0322731 A1 Dec. 23, 2010

(30) Foreign Application Priority Data

Jun. 23, 2009 (SE) .................................. 0900844

(51) Int. Cl.
*B27G 15/00* (2006.01)
(52) U.S. Cl.
USPC ............ 408/230; 408/226; 408/233; 408/713
(58) Field of Classification Search
USPC ........... 408/230, 233, 226, 713, 231, 222, 44, 408/144
See application file for complete search history.

(56) References Cited

U.S. PATENT DOCUMENTS

| | | | |
|---|---|---|---|
| 3,534,640 | A | 10/1970 | Macy |
| 5,399,051 | A | 3/1995 | Aken et al. |
| 6,012,881 | A | 1/2000 | Scheer |
| 6,299,180 | B1 | 10/2001 | Satran et al. |
| 2006/0048615 | A1 | 3/2006 | Treige |

FOREIGN PATENT DOCUMENTS

| | | |
|---|---|---|
| AT | 45310 | 12/1910 |
| DE | 20 2007 012 527 | 12/2007 |
| EP | 1 533 061 A1 | 5/2005 |
| JP | 11-197923 | 7/1999 |

(Continued)

OTHER PUBLICATIONS

Machine Translation of Inoue; JP11-197923A; Jul. 27, 1999.*

(Continued)

*Primary Examiner* — David Bryant
*Assistant Examiner* — Ryan J Walters
(74) *Attorney, Agent, or Firm* — Morgan, Lewis & Bockius LLP

(57) ABSTRACT

A rotatable tool for chip removing machining, including a basic body having front and rear ends between which a first center axis (C1) extends around which the basic body is rotatable, and a loose top having front and rear ends between which a second center axis (C2) extends. The front end of the basic body includes a jaw which is delimited by two torque-transferring drivers and an intermediate bottom in which a part of the loose top is receivable, and a center hole that mouths in the bottom of the jaw and has a hole wall which extends axially inside the basic body and in which a threaded hole mouths for a screw to co-operate with a centering pin that protrudes axially rearward from the loose top, the centering pin being insertable into the center hole. The centering pin has a cross-sectional area that is less than a cross-sectional area of the center hole. The centering pin includes two diametrically opposed surfaces, a first one of the surfaces forming a contact surface that extends tangentially between two axially running boundary generatrices which are situated along an imaginary circumscribed circle (S1), the center of which coincides with the center axis (C2) of the loose top, and between which an arc angle ($\alpha$) is less than 180°. The contact surface, via the boundary generatrices, transforms into a second one of the surfaces that is spaced-apart inwardly from the circumscribed circle (S1).

21 Claims, 6 Drawing Sheets

(56) References Cited

FOREIGN PATENT DOCUMENTS

| | | |
|---|---|---|
| JP | 2003-200311 | 7/2003 |
| JP | 3436110 | 8/2003 |
| JP | 2004-276134 | 10/2004 |
| JP | 4272455 | 6/2009 |

OTHER PUBLICATIONS

Office Action for European Patent Application No. 10 165 322.8, dated Nov. 18, 2010.

Office Action for European Patent Application No. 10 165 322.8, dated Aug. 28, 2011.

Notification of First Office Action (with English translation) for Chinese Patent Application No. 201010217786.4, dated Aug. 12, 2013.

Timchenko, A.I. et al., "RK-3 Profile-Joined Auxiliary Tools for Special Unit Machines", Russian Engineering Research, 15:10, pp. 66-72, 1995.

* cited by examiner

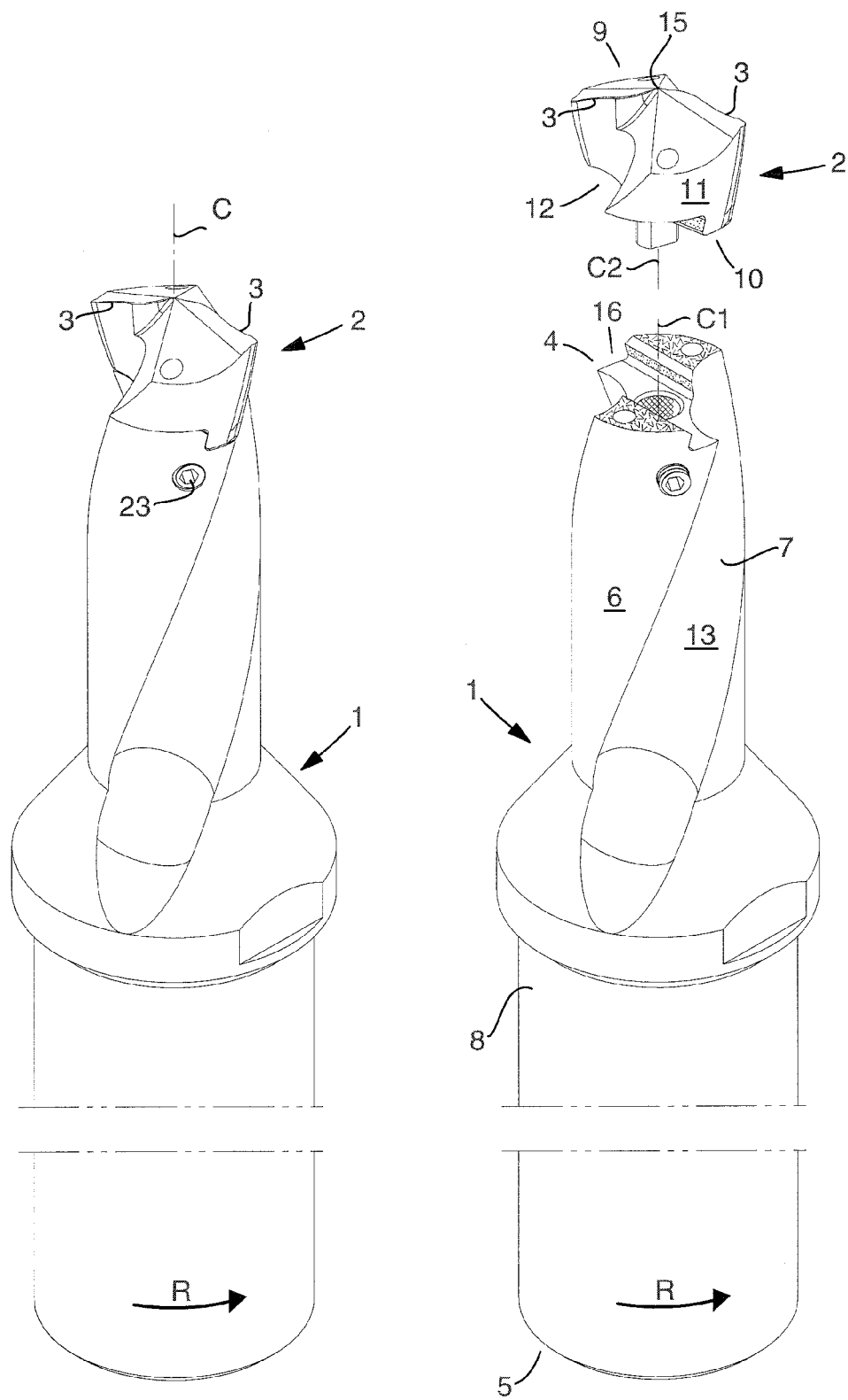

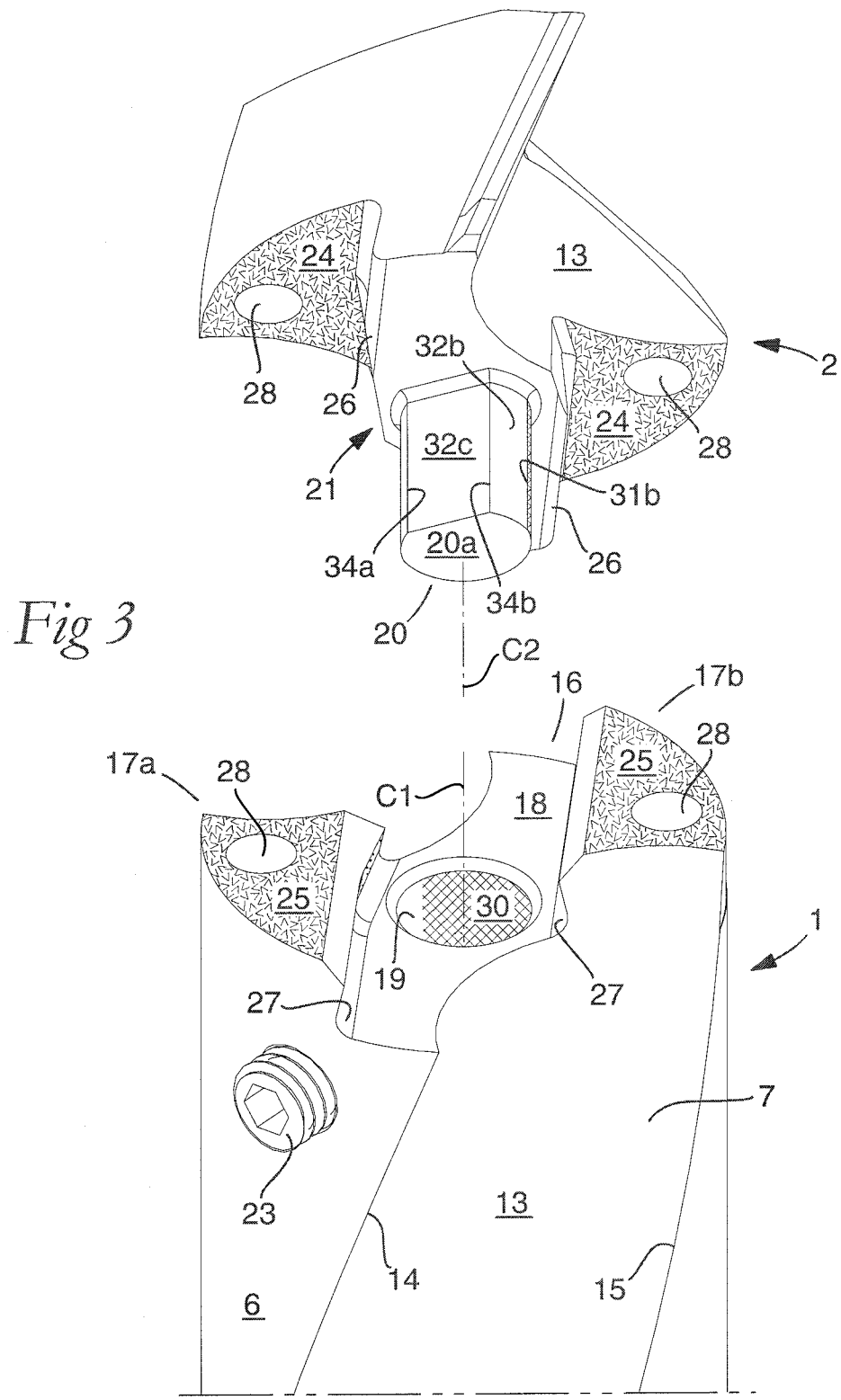

ROTATABLE TOOL FOR CHIP REMOVING MACHINING AS WELL AS A LOOSE TOP THEREFOR

This application claims priority under 35 U.S.C. §119 to Swedish Patent Application No. 0900844-2, filed on Jun. 23, 2009, which is incorporated by reference herein in its entirety.

FIELD OF THE INVENTION

The present invention relates generally to a rotatable tool for chip removing machining and of the type that includes, on one hand, a basic body having front and rear ends, between which a first center axis extends around which the basic body is rotatable, and, on the other hand, a loose top that includes front and rear ends between which a second center axis extends, the front end of the basic body including a jaw, which is delimited by two torque-transferring drivers and an intermediate bottom and in which a part of the loose top is receivable, and a centering pin that protrudes axially rearward from the loose top being insertable into a center hole that mouths in the bottom of the jaw and has a hole wall, which extends axially inside the basic body and in which a threaded hole for a screw, co-operating with the centering pin, mouths. The invention also relates generally to a loose top as such.

Tools of the kind in question are suitable for chip removing or cutting machining of workpieces of metal, such as steel, cast iron, aluminium, titanium, yellow metals, etc. The tools may also be used for the machining of composite materials of different types.

BACKGROUND OF THE INVENTION

For more than a decade, drilling tools as well as milling tools have been developed, e.g., in the form of shank-end mills, that, contrary to integral solid tools, are composed of two parts, viz. a basic body and a head being detachably connected with the same and thereby being replaceable, and in which head the requisite cutting edges are included. In such a way, the major part of the tool can be manufactured from a comparatively inexpensive material having a moderate modulus of elasticity, such as steel, while a smaller part, viz. the head, can be manufactured from a harder and more expensive material, such as cemented carbide, cermet, ceramics and the like, which gives the cutting edges a good chip-removing capacity, a good machining precision and a long service life. In other words, the head forms a wear part that can be discarded after wear-out, while the basic body can be re-used several times (e.g., 10 to 20 replacements). A now recognized denomination of such cutting edge-carrying heads is "loose tops", which henceforth will be used in this document.

On rotatable tools of the loose top type, a plurality of requirements are put, one of which is that the loose top should be held centered in an exact and reliable way in relation to the basic body. Accordingly, each unintentional eccentricity between the center axis of the loose top and the center axis of the basic body should not be more than 0.01 mm. Most preferably, it should be smaller than 0.005 mm unless exact centricity can be achieved. Another requirement or desire from the users' side is that the loose top should be mountable and dismountable in a rapid and convenient way without the basic body necessarily having to be removed from the driving machine.

Drilling tools as well as milling tools (shank-end mills) of the loose top type are widely known and may be divided into a number of different categories depending on the ideas on which the designs are based. Accordingly, certain tools use loose tops having rear center pins that entirely or partly (together with other coupling details) fulfill the purpose of centering the loose top in relation to the basic body. To this category of tools belongs among others U.S. Pat. No. 6,012,881, which discloses a loose top drill in which a rear coupling part on the loose top is inserted axially in a jaw between two non-compliant drivers, the insides of which include axially running, torque-transferring ridges that engage corresponding chutes in the coupling part of the loose top, besides which a centric pin protruding rearward from the loose top is inserted in a center hole mouthing in the bottom of the jaw. With the pin, a screw mounted in a radial hole in the basic body co-operates that has the purpose of locking the loose top in relation to the basic body. In that connection, the center pin is cylindrical and insertable at a close (form fitting) fit in a likewise cylindrical center hole, in order to, together with concave and convex contact surfaces of the drivers and the coupling part, respectively, fulfill the purpose of centering the loose top. The concurrent requirements of fit not only between the center pin and the hole, but also between the drivers and the coupling part, impose extreme, not to say practically unattainable, requirements of manufacturing precision, and if high accuracy peradventure would be achieved, the mounting and dismounting of the loose top will become particularly cumbersome.

The present invention aims at obviating the above-mentioned disadvantages of the tool according to U.S. Pat. No. 6,012,881 and at providing an improved loose-top tool. Therefore, an object of the invention is to provide a loose-top tool of the type initially mentioned, in which the loose top can be centered in a meticulously accurate way in relation to the basic body, as well as be mounted and dismounted in a simple and smooth way.

Another object of the invention is to provide a tool having a loose top, the centering pin of which can be utilized not only for the exact centering, but also to directly or indirectly—in co-operation with the radial screw—provide a simple and smooth axial locking of the loose top. More precisely, the loose top should be able to resist such negative axial forces that aim to pull the loose top axially out of the jaw, above all in connection with a drill being pulled out of a drilled hole.

SUMMARY OF THE INVENTION

In an embodiment, the invention provides a rotatable tool for chip removing machining, including a basic body having front and rear ends between which a first center axis (C1) extends around which the basic body is rotatable, and a loose top having front and rear ends between which a second center axis (C2) extends. The front end of the basic body includes a jaw which is delimited by two torque-transferring drivers and an intermediate bottom in which a part of the loose top is receivable, and a center hole that mouths in the bottom of the jaw and has a hole wall which extends axially inside the basic body and in which a threaded hole mouths for a screw to co-operate with a centering pin that protrudes axially rearward from the loose top, the centering pin being insertable into the center hole. The centering pin has a cross-sectional area that is less than a cross-sectional area of the center hole. The centering pin includes two diametrically opposed surfaces, a first one of the surfaces forming a contact surface that extends tangentially between two axially running boundary generatrices which are situated along an imaginary circumscribed circle (S1), the center of which coincides with the center axis (C2) of the loose top, and between which an arc angle ($\alpha$) is less than 180°. The contact surface, via the boundary generatrices, transforms into a second one of the surfaces that is spaced-apart inwardly from the circumscribed circle (S1).

In another embodiment, the invention provides a loose top for rotatable tools for chip removing machining, including front and rear ends between which a center axis (C2) extends, and a centering pin protruding axially rearward from the loose top. The centering pin includes two diametrically opposed surfaces, a first one of the surfaces forming a contact surface that extends tangentially between two axially running boundary generatrices which are situated along an imaginary circumscribed circle (S1), the center of which coincides with the center axis (C2), and between which an arc angle (α) is less than 180°, the contact surface, via said boundary generatrices, transforming into a second one of the surfaces that is spaced-apart inwardly from the circumscribed circle (S1).

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a perspective view of a loose-top tool in the form of a drill, the basic body and loose top of which are shown in a composed, operative state;

FIG. 2 is an exploded perspective view showing the loose top separated from the basic body;

FIG. 3 is an enlarged exploded view showing a jaw included in the basic body from a top perspective view and the loose top from a bottom perspective view;

DETAILED DESCRIPTION OF THE PREFERRED EMBODIMENTS

Figure 4:
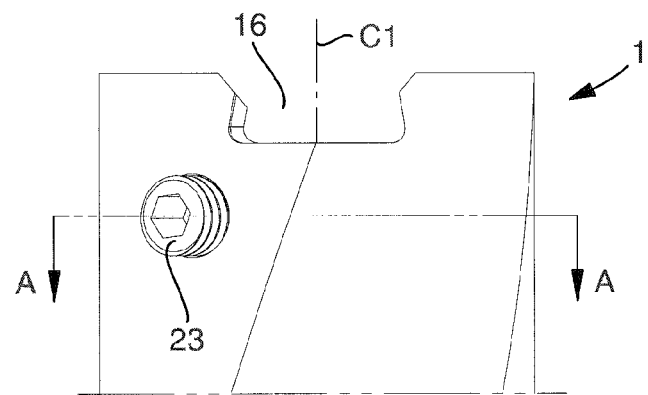
FIG. 4 is a partial side view showing a front part of the basic body.
Figure 5:
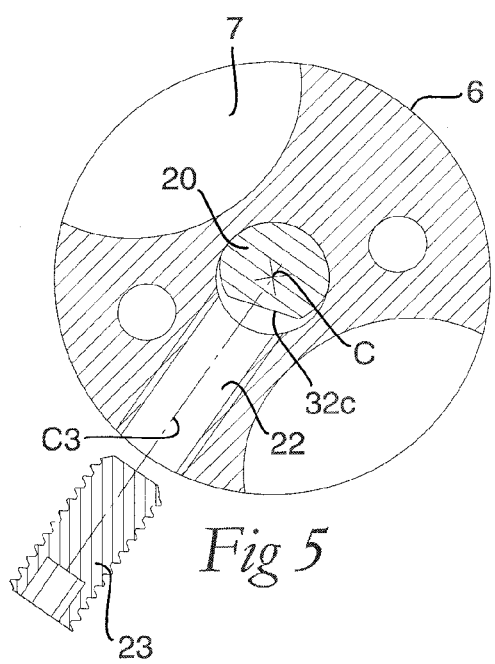
FIG. 5 is section A-A in FIG. 4, showing a screw separated from the basic body.
Figure 6:
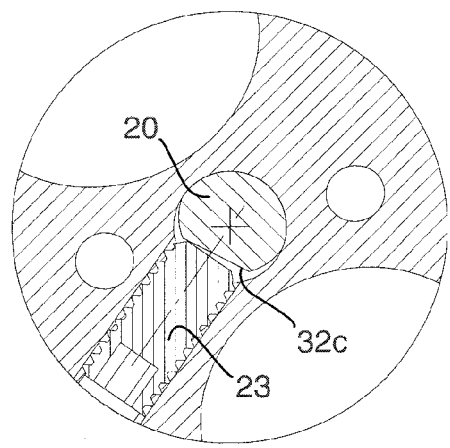
FIG. 6 is section A-A in FIG. 4, showing the same screw inserted into a radial hole in the basic body.

In the following, a number of co-operating pairs of surfaces of the basic body and the loose top, respectively, will be described. When these surfaces are present on the basic body, the same are denominated "support surfaces", while the corresponding surfaces of the loose top are denominated "contact surfaces" (e.g., "axial support surface" and "axial contact surface", respectively).

In the drawings, the invention has been exemplified in the form of two drilling tools, more precisely in the form of twist drills, i.e., drills, the chip flutes of which are helicoidal. The tool shown in FIGS. 1 and 2 includes a basic body 1 and a loose top 2 in which the requisite cutting edges 3 are included. In its assembled, operative state according to FIG. 1, the tool is rotatable around a center axis designated C, more precisely in the direction of rotation R. In FIG. 2, it is seen that the basic body 1 includes front and rear ends 4, 5 between which a center axis C1 specific to the basic body extends. In the backward direction from the front end 4, a cylindrical envelope surface 6 extends, in which two chip flutes 7 are countersunk that in this case are helicoidal (the invention is also applicable to so-called tap borers having straight chip flutes). In the example, the chip flutes 7 end in a collar included in a rear part 8 that is intended to be attached to a driving machine (not shown).

Also the loose top 2 includes front and rear ends 9, 10 and an own center axis C2 with which two envelope part surfaces 11 are concentric. Between the envelope part surfaces 11, two helicoidal chip flutes or chip flute sections 12 are countersunk, which form extensions of the chip flutes 7 of the basic body 1 when the loose top is mounted onto the basic body. If the loose top 2 is centered correctly in relation to the basic body, the individual center axes C1 and C2 coincide with the center axis C of the assembled drilling tool.

Since the major part of the basic body 1 lacks interest in connection with the invention, henceforth only the front end portion thereof will be illustrated together with the loose top 2, more precisely on an enlarged scale.

Now reference is made also to FIGS. 3-6, FIG. 3 of which illustrates how the chip flutes 7 of the basic body 1 are delimited by concave surfaces 13 that extend between helicoidal borderlines 14, 15. In an analogous way, each chip flute 12 in the loose top 2 includes a concave limiting surface 13. The design of the front end 9, in which the cutting edges 3 are formed, lacks other interest in connection with the invention than that the cutting edges meet in a front tip 15 (see FIG. 2) through which the center axis C2 runs.

As is seen in FIG. 3, in the front part of the basic body 1, a jaw 16 is formed, which is delimited by two diametrically separated drivers 17a, 17b as well as an intermediate bottom 18 in the form of a plane surface. In the bottom 18, a center hole 19 mouths in which a centering pin 20 is insertable that protrudes axially rearward from a rear coupling part 21 included in the loose top 2 and has a plane end 20a. The drivers 17a, 17b are non-compliant lugs (contrary to elastically compliant branches). In this case, the hole wall of the center hole 19 is cylindrical and extends so far into the basic body that a radial hole 22 (see FIG. 5) can mouth therein. The hole 22 includes a female thread that can co-operate with a male thread of a screw 23, which is movable into and out of the hole 22 and serves as a clamping device for the pin 20. In the embodiment shown, the coupling part 21 of the loose top separates two axial contact surfaces 24, which are pressable against axial support surfaces 25 of the free ends of the drivers 17a, 17b. The coupling part 21 is initially insertable in the axial direction between the drivers, and can then—by the screw 23—be turned into an end position in which male members in the form of ridges 26 on the coupling part 21 engage female-like chutes 27 in the insides of the drivers 17a, 17b. The ridges and chutes include side surfaces via which torque can be transferred from the drivers to the loose top. As is clearly seen in FIG. 3, the insides of the drivers are made with an asymmetrical shape, like the two ridges 26 on the coupling part 21, in order to prevent the loose top from being mounted in an erroneous way in the jaw of the basic body.

It should also be noted that flushing-medium ducts 28 mouth in the axial support surfaces 25 of the basic body as well as in the axial contact surfaces 24 of the loose top. The ducts have the purpose of conveying flushing medium to the area of the cutting edges of the loose top.

Figure 7:
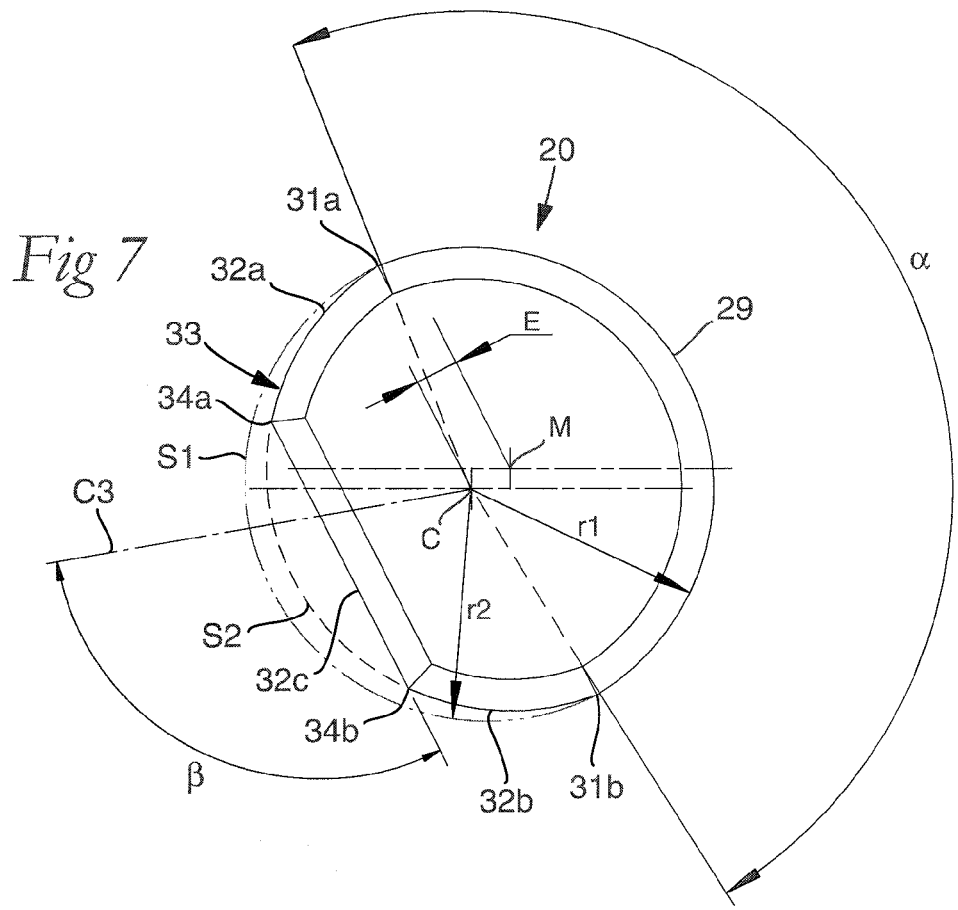
FIG. 7 is an enlarged and schematic picture that illustrates the geometrical design of a centering pin included in the loose top.

Reference is now made to FIG. 7, which on an enlarged scale schematically shows the geometrical design of the centering pin 20. In this figure, S1 designates a circle circumscribed around the pin 20, the center of which coincides with the center axis C2 of the loose top. Simultaneously, in this case the circle S1 represents the cylindrical hole wall of the center hole 19, which is concentric with the center axis C1 of the basic body. When the loose top is correctly centered in relation to the basic body, the specific center axes C1 and C2 coincide with the center axis C of the composed tool, and therefore only the center axis C is depicted in FIG. 7. In the pin 20, two diametrically opposed surfaces are included, a first one of which forms a contact surface 29 that in the example has a cylindrical basic shape and is pressable against the hole wall in the center hole 19 approximately in the surface field that is designated 30 in FIG. 3. This surface field 30 is essentially situated opposite the mouth of the radial hole 22 in the center hole 19. The contact surface 29 extends tangentially between two axially running boundary generatrices 31a, 31b, which are situated along the circumscribed circle S1 (like all arbitrary points situated along the surface between the boundary generatrices). The tangential extension of the contact surface 29 is determined by an arc angle α that according to an embodiment of the invention is less than 180°. In the example according to FIG. 7, a amounts to 170°. At the two boundary generatrices 31a, 31b, the contact surface 29 transforms into two clearance surfaces 32a, 32b, which, together with a third surface 32c, are included in a second surface that in its entirety is designated 33, and that is diametrically opposite the contact surface 29. In this case, the surface 32c is plane and forms a shoulder surface for the screw 23, while the two clearance surfaces 32a, 32b are convex. More precisely, the clearance surfaces 32a, 32b are individually cylindrical and tangent to an imaginary, common circle S2, the center M of which is eccentric in relation to the center of the circumscribed circle S1, i.e., the center axis C. The eccentricity is designated E.

As is clearly seen in FIG. 7, the two clearance surfaces 32a, 32b are spaced-apart inwardly from the circumscribed circle S1 (and thereby the hole wall in the hole 19), so far that the radial distance between the circle S1 and the respective clearance surface successively increases in the direction from the boundary generatrices 31a, 31b toward the two boundary generatrices 34a, 34b, at which the clearance surfaces transform into the plane shoulder surface 32c. By this geometry, it is ensured that the two clearance surfaces 32a, 32b do not contact the hole wall in the operative end position of the loose top. Furthermore, the geometry results in that the radial distance r1 between the center axis of the pin 20 and arbitrary points along the contact surface 29 delimited between the boundary generatrices 31a, 31b, always is as great as the corresponding radial distance r2 between the hole wall and the center axis of the basic body. This means that the pin 20 for certain is located with the specific center axis C2 thereof in a position coinciding with the center axis C1 of the hole as soon as the contact surface 29 (by the screw 23) is pressed against the hole wall. In order to ensure an exact centering, the contact surface of the pin may be made with an extraordinary high dimensional accuracy, e.g., by precision grinding. In such a way, a dimensional accuracy of 0.01 mm (or better) can be provided.

In the example shown, the surfaces 32a, 32b and 32c are part surfaces of the common surface 33 that is opposite the contact surface 29 and that extends between the two boundary generatrices 31a and 31b. This surface 33 has no contact with the hole wall when the loose top assumes its operative end position, and may therefore per se be regarded as a sole clearance surface.

In this connection, it should be pointed out that the loose top in practical production usually is manufactured from cemented carbide or other hard and wear-resistant materials, more precisely by moulding or injection moulding and sintering. In doing so, the outcome of the manufacture may vary, and therefore a precision machining afterward is preferred in order to provide at least the contact surface 29 with an extraordinary good dimensional accuracy. The basic body 1, on the contrary, is usually manufactured from steel that does not present any difficulties to drill or mill the center hole 19 in a single operation with a high accuracy.

In FIG. 7, the center axis C3 of the radial hole 22 is illustrated by a dash-dotted line that forms an obtuse angle β with the plane shoulder surface 32c. When the pin 20, before turning-in of the ridges 26 of the loose top into the chutes 27, assumes an initial position in the jaw 16 of the basic body, the shoulder surface 32c and the center axis C3 form this angle β, which in the example amounts to 115°. When the screw 23 is pressed against the shoulder surface 32c in the direction of the center axis C2, the pin is therefore subjected to a force that turns the pin until the coupling part 21 abuts against the insides of the drivers 17a, 17b, i.e., with the ridges 26 in engagement with the chutes 27. Possibly, the mechanical turning by the screw 23 may be preceded by an initial turning-in in a manual way.

It should be axiomatic that the pin 24 by its geometry has a cross-sectional area that is less than the cross-sectional area of the hole 19.

Figure 8:
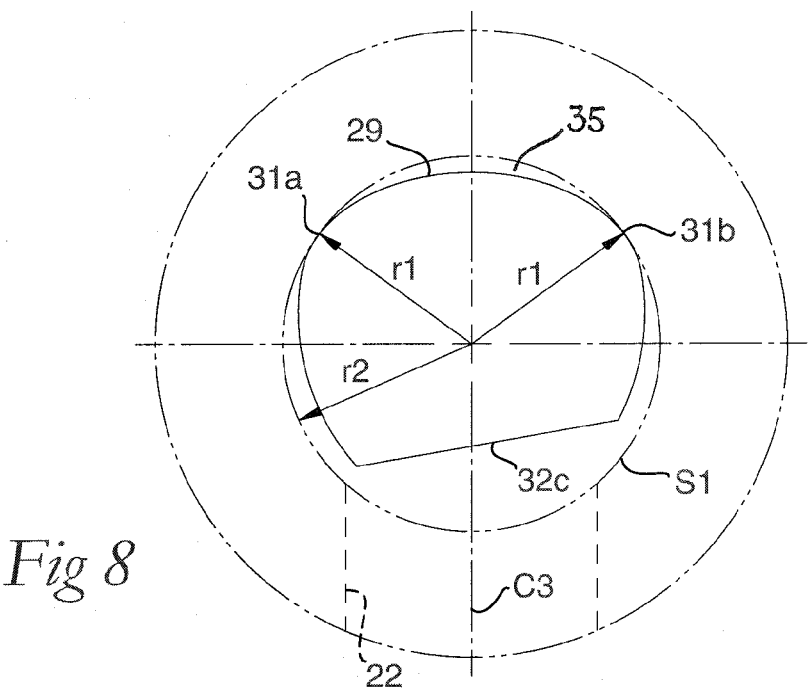
FIG. 8 is an analogous picture showing an alternative embodiment of the pin.
Figure 9:
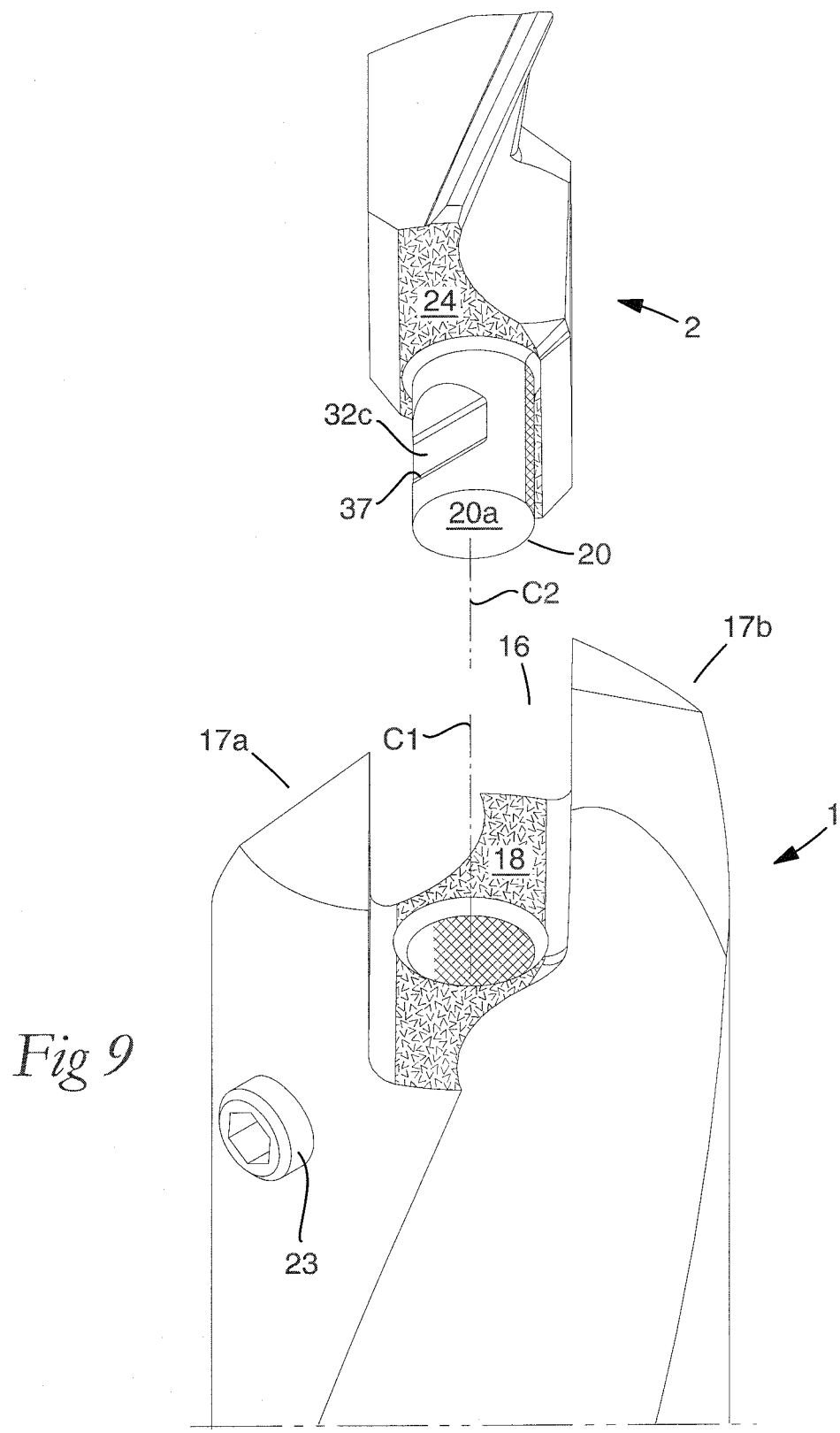
FIG. 9 is a perspective exploded view showing an alternative embodiment of a loose top according to the invention.
Figure 10:
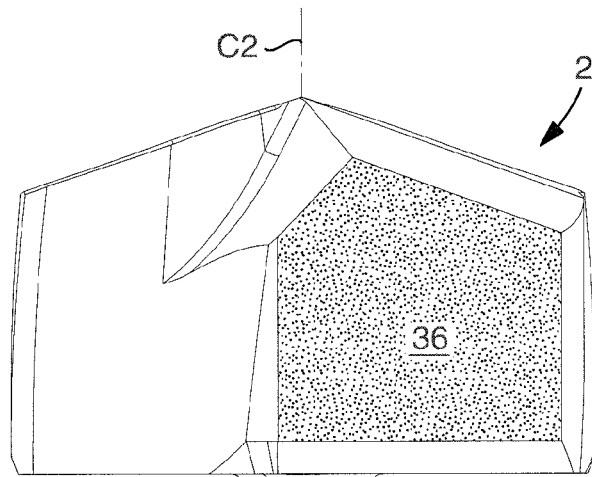
FIG. 10 is a side view of the loose top according to FIG. 9 as viewed along a long side.
Figure 11:
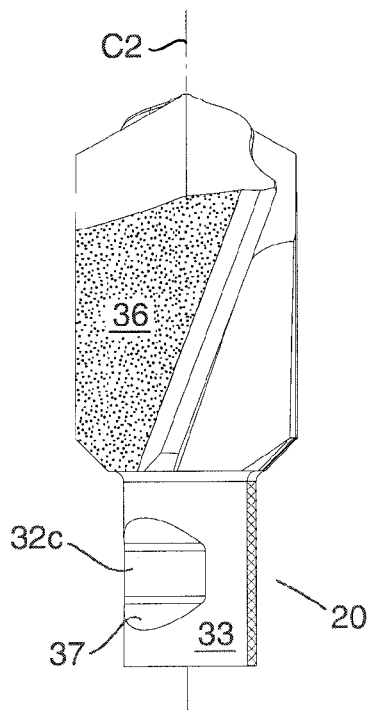
FIG. 11 is a side view of the loose top as viewed at an angle of 90° to the view according to FIG. 10.

In FIG. 8, an alternative embodiment of the pin 20 is illustrated. Also in this case, the hole wall in the hole 19 is cylindrical and has a cross-sectional area that is larger than the cross-sectional area of the pin 20. Instead of being cylindrical, the contact surface 29 of the pin 20 is in this case elliptic between the two boundary generatrices 31a, 31b that determine the tangential extension of the contact surface. In doing so, a crescent-shaped gap 35 arises between the contact surface and the hole wall, the pin obtaining line contact with the hole wall in two separated places, viz. along the boundary generatrices 31a, 31b. By imparting the contact surface 29 a high dimensional accuracy, the radial distances r1 between the center axis of the pin (and of the loose top) C2 and the boundary generatrices 31a, 31b may also in this case be made exactly as large as the radius r2 between the hole wall and the center axis C1 of the basic body. When the pin is pressed against the inclined shoulder surface 32c, accordingly an exact centering of the loose top is obtained regardless into which position the pin is turned.

In practice, the arc angle α between the boundary generatrices 31a, 31b of the contact surface 29 should amount to at least 90° and at most 175°.

When the loose top 2 is to be mounted in the jaw 16 of the basic body 1, the screw 23 is held in an initial position, in which the inner end thereof is removed from the center hole 19 of the basic body. In this state, the coupling part 21 of the loose top is inserted axially between the drivers 17a, 17b and with the pin 20 sticking into the center hole 19. The insertion of the pin into the center hole can be made without difficulty, because the cross-sectional area of the pin is less than the cross-sectional area of the center hole. During this initial insertion of the coupling part, the axial contact surfaces 24 of the loose top will be pressed and rest against the axial support surfaces 25 of the drivers 17a, 17b, without the underside of the coupling part contacting the bottom surface of the jaw. After possible manual turning-in of the loose top toward the end position, the screw 23 is tightened in the way shown in FIG. 6. In such a way, the screw will be pressed against the shoulder surface 32c, and as a consequence of the same being inclined in relation to the center axis C3 of the radial hole 22, the pin will be turned until the side contact surfaces of the coupling part 21 are pressed in close contact with the corresponding surfaces of the insides of the drivers. In this position, in which the loose top is axially locked in relation to the basic body, the loose top is clamped in a reliable way as long as the screw 23 retains the pin in the assumed rotation angle position. When the screw 23 is tightened, the contact surface 29 of the pin will be pressed in close contact with the hole wall in a position where the center axis C2 of the loose top exactly coincides with the center axis C1 of the basic body.

Reference is now made to FIGS. 9-12, which illustrate an alternative embodiment of the tool according to the invention. In this case, the loose top 2 lacks the rear coupling part that is included in the previously described embodiment. For this reason, the loose top is housed in its entirety between the two drivers 17a, 17b of the basic body, a lower axial contact surface 24 of the loose top being pressed against the bottom 18 of the jaw 16, which therefore serves as an axial support surface for the loose top. Side contact surfaces 36 on opposite sides of the loose top are pressed against the insides of the drivers, more precisely by the centering pin 20 of the loose top being subjected to a turning force by the screw 23.

Figure 12:
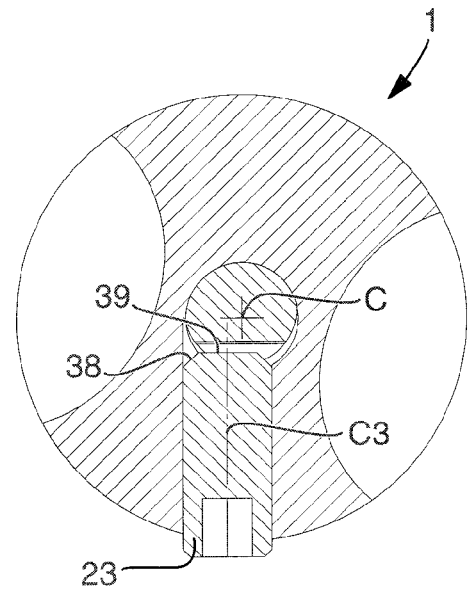
FIG. 12 is a cross-section through the basic body on a level with the radial screw thereof.

In contrast to the previously described embodiment, in which the plane shoulder surface 32c of the pin 20 extends from the end 20a of the pin and along the entire length of the pin, the pin 20 according to FIGS. 9-12 includes a shoulder surface 32c that is surrounded by two inclined chamfer surfaces, the chamfer surface 37 of which, positioned axially behind the surface 32c, gets in contact with the screw when the same is pressed against the shoulder surface 32c. More precisely, in this case the screw 23 includes a pronounced cone surface 38 at the front end thereof, as is seen in FIG. 12. In FIG. 12, it is furthermore seen that in this case, the center axis C3 of the screw hole extends eccentrically in relation to the center axis C being common to the loose top and the basic body, more precisely in such a way that the center axis C3 is directed beside the center axis C. The consequence of this will be that the front, plane end surface 39 of the screw is pressed eccentrically against the shoulder surface 32c, at the same time as the cone surface 38 is pressed against the chamfer surface 37. In such a way, the pin is brought to turn at the same time as it is subjected to a positive axial force that aims to press the axial contact surface 24 against the axial support surface 18. In the operative state according to FIG. 12, the screw 23 will lock the loose top against negative axial forces that aim to pull the loose top out of the jaw 16. Simultaneously, the screw will hold the side contact surfaces 36 of the loose top pressed against the insides of the drivers 17a, 17b, whereby torque can be transferred from the drivers to the loose top without any play.

A fundamental advantage of the invention is that it ensures an utmost accurate centering of the loose top without making its mounting and dismounting more difficult. In addition, the pin of the loose top—by being formed with suitably plane shoulder surfaces of the kind described—may be utilized to either only turn the pin or only apply an axial tensile force to the loose top. Turning may also be combined with an axial retraction, as exemplified in FIGS. 9-12.

While the invention has been disclosed with reference to certain preferred embodiments, numerous modifications, alterations, and changes to the described embodiments are possible without departing from the sphere and scope of the invention, as defined in the appended claims and their equivalents thereof. For example, the described shoulder surfaces for the screw may be entirely spared if the pin of the loose top is merely utilized for centering purposes. In such cases, the screw may be pressed against a second surface that is opposite the contact surface and may have any design, provided that it clears from the hole wall. Neither needs the center hole in the basic body be genuinely cylindrical, provided that the cross-sectional area of the hole is larger than that of the pin. Accordingly, it is only required that the hole includes a part-cylindrical surface, against which the contact surface of the pin can be pressed. Furthermore, the concept "contact surface" should be interpreted in a wide sense and is considered to include any convex surface formation irrespective of whether the surface formation gives complete surface contact or only partial contact with the hole wall (e.g., line contact according to the example in FIG. 8). For the sake of completeness, it should be pointed out that the invention is also applicable to other rotatable loose-top tools than exactly drills, in particular milling cutters such as shank-end mills. Accordingly, it is intended that the invention not be limited to the described embodiments, but that it have the full scope defined by the language of the following claims.

What is claimed is:

1. A rotatable tool for chip removing machining, comprising:
   a basic body having front and rear ends between which a first center axis (C1) extends around which the basic body is rotatable; and
   a loose top having front and rear ends between which a second center axis (C2) extends and a centering pin that protrudes axially rearward from the rear end,
   wherein the front end of the basic body includes a jaw which is delimited by two torque-transferring drivers and an intermediate bottom in which a part of the loose top is receivable, and a center hole that mouths in the bottom of the jaw and has a hole wall which extends axially inside the basic body and in which a threaded hole mouths for a screw to co-operate with the centering pin of the loose top, the centering pin being insertable into the center hole,
   wherein the centering pin has a cross-sectional area that is less than a cross-sectional area of the center hole, the centering pin including two diametrically opposed surfaces,
   wherein a first one of the surfaces forms a contact surface that extends tangentially between two axially running boundary generatrices which are situated along an imaginary first circumscribed circle (S1), the center of which coincides with the second center axis (C2) of the loose top, and between which an arc angle (α) is less than 180°,
   wherein the contact surface, via the boundary generatrices, transforms into a second one of the surfaces, the second one of the surfaces being that is spaced-apart inwardly from the first circumscribed circle (S1),
   wherein the second one of the surfaces includes a shoulder surface, which is surrounded by two clearance surfaces extending from the boundary generatices,
   wherein axially behind the shoulder surface, a chamfer surface is present, which is inclined radially outward in relation to the shoulder surface, and
   wherein the shoulder surface is facing the threaded hole for the screw so the screw applies a turning force to the pin to urge two opposed side surfaces of the loose top against the torque-transferring drivers.

2. The tool according to claim 1, wherein the shoulder surface is between two clearance surfaces, each clearance surface extending from a different one of the two axially running boundary generatrices.

3. The tool according to claim 2, wherein the shoulder surface of the pin of the loose top is plane.

4. The tool according to claim 3, wherein the threaded hole has a center axis (C3) directed radially toward a center axis (C) of the tool, and the loose top, in an initial position between the drivers, has the pin adjusted so that the plane shoulder surface forms an obtuse angle ($\beta$) with the center axis (C3) of the threaded hole.

5. The tool according to claim 2, wherein the second surface, in which the two clearance surfaces of the pin of the loose top are included, has a cylindrical basic shape that is defined by a second, imaginary circle (S2), the center (M) of which is eccentric in relation to a center axis (C) of the tool.

6. The tool according to claim 2, wherein the threaded hole has a center axis (C3) extending eccentrically in relation to a center axis (C) of the tool.

7. The tool according to claim 1, wherein an axial pulling force is applied to the pin by the inclined chamfer surface.

8. The tool according to claim 1, wherein the hole wall in the center hole as well as the contact surface of the pin of the loose top are cylindrical.

9. The tool according to claim 1, wherein the hole wall in the center hole is cylindrical, while the contact surface of the pin of the loose top is elliptic.

10. The tool according to claim 1, wherein the shoulder surface is plane and the second one of the surfaces further includes at least a clearance surface that is convex, the clearance surface extending tangentially between the shoulder surface and one of the two axially running boundary generatrices and situated along an imaginary second circumscribed circle (S2), the center (M) of which is eccentric in relation to the second center axis (C2).

11. The tool according to claim 10, wherein the shoulder surface defines a chord inside the first circumscribed circle (S1).

12. The tool according to claim 1, wherein the loose top includes coupling parts with male members and the torque-transferring drivers include female-like chutes on an inside surface, and wherein the male members of the coupling parts engage the female-like chutes on the torque-transferring drivers.

13. The tool according to claim 12, wherein the female-like chutes on different torque-transferring drivers have an asymmetric geometry.

14. The tool according to claim 1, wherein the contact surface makes area contact with an area of the hole wall of the center hole.

15. A loose top for rotatable tools for chip removing machining, comprising:
    front and rear ends between which a center axis (C2) extends; and
    a centering pin protruding axially rearward from the loose top,
    wherein the centering pin includes two diametrically opposed surfaces, a first one of the surfaces forming a contact surface that extends tangentially between two axially running boundary generatrices which are situated along an imaginary first circumscribed circle (S1), the center of which coincides with the center axis (C2), and between which an arc angle ($\alpha$) is less than 180°, the contact surface, via said boundary generatrices, transforming into a second one of the surfaces that is spaced-apart inwardly from the first circumscribed circle (S1), and includes a shoulder surface, which is surrounded by two clearance surfaces extending from the boundary generatrices, and
    wherein, axially behind the shoulder surface, a chamfer surface is present, which is inclined radially outward in relation to the shoulder surface.

16. The loose top according to claim 15, wherein the the shoulder surface being is between two clearance surfaces, each clearance surface extending from a different one of the two axially running boundary generatrices.

17. The loose top according to claim 16, wherein the shoulder surface is plane and defines a chord inside the first circumscribed circle (S1).

18. The loose top according to claim 17, wherein an axial tensile force can also be applied to the centering pin by the inclined chamfer surface.

19. The loose top according to claim 16, wherein the second surface has a cylindrical basic shape that is defined by a second circle (S2), the center (M) of which is eccentric in relation to the center axis (C2).

20. The loose top according to claim 15, wherein the contact surface is cylindrical.

21. The loose top according to claim 15, wherein the contact surface is elliptical.

* * * * *